US009276840B2

(12) United States Patent
Scott et al.

(10) Patent No.: US 9,276,840 B2
(45) Date of Patent: Mar. 1, 2016

(54) INTEREST MESSAGES WITH A PAYLOAD FOR A NAMED DATA NETWORK

(71) Applicant: Palo Alto Research Center Incorporated, Palo Alto, CA (US)

(72) Inventors: Glenn C. Scott, Los Altos, CA (US); Priya Mahadevan, Sunnyvale, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 195 days.

(21) Appl. No.: 14/067,586

(22) Filed: Oct. 30, 2013

(65) Prior Publication Data

US 2015/0117253 A1 Apr. 30, 2015

(51) Int. Cl.
*H04L 12/24* (2006.01)
*H04L 12/26* (2006.01)
*H04L 12/28* (2006.01)
*G06F 15/16* (2006.01)
*G06F 15/173* (2006.01)
*H04L 12/725* (2013.01)
*H04L 12/721* (2013.01)
*H04L 29/08* (2006.01)

(52) U.S. Cl.
CPC ............. *H04L 45/306* (2013.01); *H04L 45/34* (2013.01); *H04L 67/327* (2013.01)

(58) Field of Classification Search
CPC ............. H04L 29/06; H04L 29/08072; H04L 29/0809; H04L 29/08144; H04L 45/306; H04L 45/308; H04L 45/00; H04L 41/08; H04L 41/0803; H04L 67/327
USPC ........... 370/235, 252; 709/220, 231, 238, 249
See application file for complete search history.

(56) References Cited

U.S. PATENT DOCUMENTS

| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,506,844 | A * | 4/1996 | Rao ................................ 370/468 |
| 5,629,370 | A | 5/1997 | Freidzon |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Fall, K. et al., "DTN: an architectural retrospective", Selected areas in communications, IEEE Journal on, vol. 28, No. 5, Jun. 1, 2008, pp. 828-835.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.

(Continued)

*Primary Examiner* — Wutchung Chu
(74) *Attorney, Agent, or Firm* — Shun Yao; Park, Vaughan, Fleming & Dowler LLP

(57) ABSTRACT

A network device can process a payload in an Interest packet. During operation, the network device can receive an Interest packet that includes a name or a name prefix associated with one or more target entities for the Interest. If the network device determines that the Interest packet includes a payload, the network node can analyze the Interest's name and/or payload to determine an operation to perform for processing the payload. The network device then proceeds to process the payload by performing the determined operation.

21 Claims, 8 Drawing Sheets

(56) References Cited

U.S. PATENT DOCUMENTS

| | | |
|---|---|---|
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 * | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |

(56) References Cited

U.S. PATENT DOCUMENTS

| | | |
|---|---|---|
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1* | 10/2008 | Kahn et al. .................. 713/170 |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1* | 1/2009 | Collins ............... H04L 63/0245 710/8 |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1* | 2/2010 | Beverly et al. ................. 370/389 |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1* | 8/2010 | Jacobson et al. ............. 370/392 |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1* | 11/2010 | Beser ............................ 709/238 |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1* | 4/2011 | Jacobson ............... H04L 45/745 370/392 |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1* | 2/2012 | Erdmann ............. H04L 63/0428 713/150 |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1* | 3/2013 | Wang et al. .................. 709/238 |
| 2013/0073552 A1 | 3/2013 | Rangwala |

(56) References Cited

U.S. PATENT DOCUMENTS

| | | |
|---|---|---|
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1* | 7/2013 | Lee et al. ............ 370/231 |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1* | 8/2013 | Lee ............ 709/223 |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1* | 8/2013 | Ravindran et al. ............ 709/238 |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1* | 12/2013 | Cook et al. ............ 370/474 |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1* | 4/2015 | Ohnishi et al. ............ 709/223 |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

"The FP7 4WARD project," http://www.4ward-project.eu/. downloaded Mar. 11, 2015.

A. Broder and A. Karlin, "Multilevel Adaptive Hashing", Jan. 1990, pp. 43-53.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

Baugher, Mark et al., "Self-Verifying Names for Read-Only Named Data", 2012 IEEE Conference on Computer Communications Workshops (INFOCOM WKSHPS), Mar. 2012, pp. 274-279.

C.A. Wood and E. Uzun, "Flexible end-to-end content security in CCN," in Proc. IEEE CCNC 2014, Las Vegas, CA, USA, Jan. 2014. Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Detti et al., "Supporting the Web with an information centric network that routes by name", Aug. 2012, Computer Networks 56, pp. 3705-3702.

E. Rescorla and N. Modadugu, "Datagram transport layer security," IETF RFC 4347, Apr. 2006.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia-Luna-Aceves, Jose J. 'Name-Based Content Routing in Information Centric Networks Using Distance Information' Proc ACM ICN 2014, Sep. 2014.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication

(56) References Cited

OTHER PUBLICATIONS paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Koponen, Teemu et al., "A Data-Oriented (and Beyond) Network Architecture", SIGCOMM '07, Aug. 27-31, 2007, Kyoto, Japan, XP-002579021, p. 181-192.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Matteo Varvello et al., "Caesar: A Content Router for High Speed Forwarding", ICN 2012, Second Edition on Information-Centric Networking, New York, Aug. 2012.
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
NDN Project [online], http://www.named-data.net/, Downloaded Mar. 9, 2015.
Rosenberg, J. "Interactive Connectivity Establishment (ICE): A Protocol for Network Address Translator (NAT) Traversal for Offer/Answer Protocols", Apr. 2010, pp. 1-117.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Misra, R. Tourani, and N. E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
T. Ballardie, P. Francis, and J. Crowcroft, "Core Based Trees (CBT)," Proc. ACM SIGCOMM '88, Aug. 1988.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N. H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Xylomenos, George, et al. "A survey of information-centric networking research." Communications Surveys & Tutorials, IEEE 16.2 (2014): 1024-1049.
Zhang, et al., "Named Data Networking (NDN) Project", http://www.parc.com/publication/2709/named-data-networking-ndn-project.html, Oct. 2010, NDN-0001, PARC Tech Report.
Soh et al., "Efficient Prefix Updates for IP Router Using Lexicographic Ordering and Updateable Address Set", Jan. 2008, IEEE Transactions on Computers, vol. 57, No. 1.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

* cited by examiner

INTEREST MESSAGES WITH A PAYLOAD FOR A NAMED DATA NETWORK

BACKGROUND

1. Field

This disclosure is generally related to computer networks. More specifically, this disclosure is related to an Interest packet that includes a name and a payload.

2. Related Art

The proliferation of mobile computing and cellular networks is making digital content more mobile than ever before. People can use their smartphones to generate content, to consume content, or even to provide Internet access to other computing devices that generate or consume content. Oftentimes, a device's network location can change as a person takes this device to a new physical location. This can make it difficult to communicate with this device under a traditional computer network (e.g., the Internet) when the device's new network location is not known.

To solve this problem, information-centric network architectures have been designed to facilitate accessing digital content based on its name, regardless of the content's physical or network location. These architectures allow a network device to obtain data from a content producer, regardless of the content producer's physical or network location, or from any other device that has cached the same piece of content. Content-centric Networking (CCN) or named-data networking is an example of an Information-centric networking architecture.

In CCN, Interests do not include a payload. Each Interest encodes the information necessary for reaching a content producer in the Interest's name. Some client devices attach additional information into an Interest's name to provide this information to the content producer. Unfortunately, there is a limit to the amount information that can be attached to the Interest's name. A name that is too large can cause routers to drop the Interest packet when the name does not fit into a pending interest table (PIT), or when the name does not match an entry in a forwarding information base (FIB).

SUMMARY

One embodiment provides an Interest-processing network device that operates in a named-data network (NDN), and facilitates processing an Interest's payload to cache the payload or to manipulate one or more local resources. Specifically, each Interest includes a name, and can include a payload. The Interest's name can have a fixed length, or can have an arbitrary length. The Interest's name can be hierarchical (e.g., includes an ordered sequence of name elements), or can be a flat name (e.g., a hash value). The Interest's payload can also carry instructions that can manipulate resources at network devices that receive, process, store, and/or forward an Interest or the Interest's payload.

The network device can include, for example, a router, a wireless access point, a cache server, a computer cluster, a peer network device, or any other device coupled to a named-data network or an information-centric network. The device's resources can include a forwarding information base (FIB), a pending interest table (PIT), a content store (CS), a repository, and/or any other resources now known or later developed. The device's resource can also include any other resource accessible to a computing device, such as a processing unit, a memory, a non-volatile storage device, a network interface, etc.

During operation, the network device can receive an Interest packet that includes a name or a name prefix associated with one or more target entities for the Interest. If the network device determines that the Interest packet includes a payload, the network node can analyze the Interest's name and/or payload to determine an operation to perform for processing the payload. The network device then proceeds to process the payload by performing the determined operation.

In some embodiments, the payload includes data for a target entity that is to consume the Interest packet (e.g., a target entity associated with the Interest's name).

In some variations to these embodiments, the network device can determine, based on the Interest's name, that the local network node is not an intended recipient of the Interest's payload. For example, the network device may be a router that forwards the Interest toward a content producer that is to consume the Interest. The network device processes the payload by caching or storing the Interest's payload in a local content store in association with the Interest's name. The network device can also forward the Interest packet via an interface or a virtual interface associated with the Interest packet's name or name prefix.

In some variations to these embodiments, the network device can determine, based on the Interest's name, that the local network node is an intended recipient of the Interest's payload. For example, the network device may be a content producer that consumes the Interest. The network device then determines a local application associated with the Interest's name or name prefix, and uses the application to process the payload.

In some embodiments, the payload includes instructions or data for configuring a network node. The instructions can include at least one of: program instructions; a binary executable file; a virtual machine executable file; and a script. The data can include, for example, a configuration file. For example, the network node can include a router or network device that forwards Interests toward a content producer. The network node can execute the instructions or process the data to manipulate one or more local resources that are used to forward packets over a named-data network or an information-centric network.

In some variations to these embodiments, the Interest packet includes access control information. Further, while processing the Interest's payload, the network device can determine whether the access control information grants the Interest packet permission to reconfigure the network node. If so, the network device executes the instructions to reconfigure the network node.

In some variations to these embodiments, the instructions or data configure routing information at the local computing device.

In some variations to these embodiments, the instructions or data configure a maximum bandwidth for an interface of the local computing device.

BRIEF DESCRIPTION OF THE FIGURES

In the figures, like reference numerals refer to the same figure elements.

DETAILED DESCRIPTION

Figure 1:
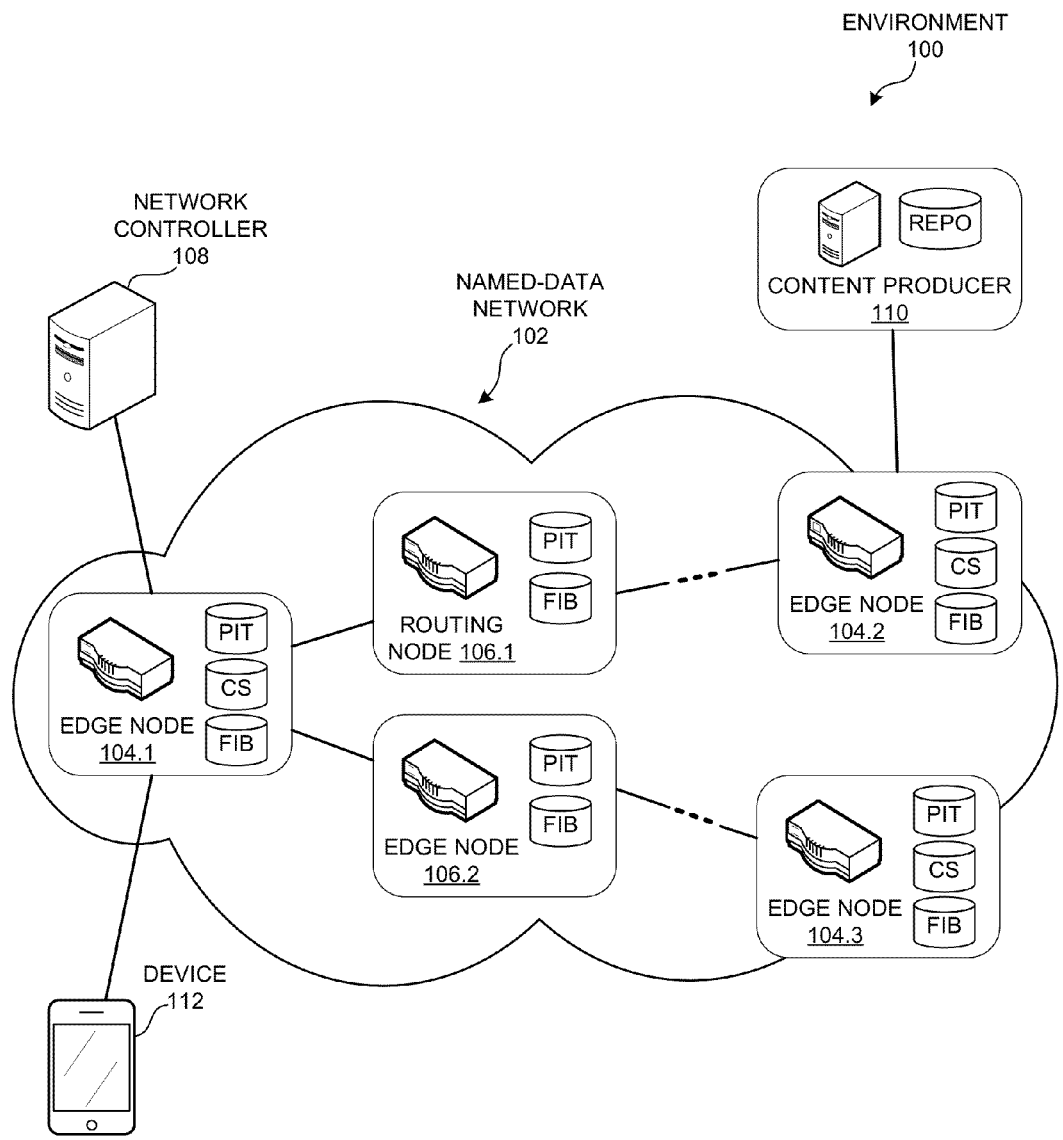
FIG. 1 illustrates an exemplary computing environment that facilitates processing and forwarding an Interest packet that carries a payload in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of pushing content over a named-data network (NDN) or a content-centric network (CCN) by including a payload in an Interest packet. CCN or NDN is an example of an Information-centric networking (ICN) architecture. In the present invention, the Interest packet includes a name that can be used to route the Interest packet, and can include a payload that is separate from the name. This payload can include data that is to be pushed to a target device associated with the Interest's name, such as a content custodian or a content consumer. For example, a network router can read a payload from an Interest to cache data that is being pushed to a consumer of the Interest. As another example, the payload can include instructions or configuration information that network routers can use to manipulate or configure one or more local resources. A network router can process and execute instructions from the Interest's payload to create, read, update, and/or delete data on a local resource.

In a typical CCN, all content is named, and each piece of data is bound to a unique name that distinguishes the data from any other piece of data, such as other versions of the same data or data from other sources. This unique name allows a network device to request the data by disseminating an Interest that includes the name (or a name prefix), and can obtain the data independent from the data's storage location, network location, application, and means of transportation. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

The following terms describe elements of a CCN architecture:

Content Object: A single piece of data, which is bound to a unique name. Content Objects are "persistent," which means that a Content Object can move around within a computing device, or across different computing devices, but does not change. If any component of the Content Object changes, the entity that made the change creates a new Content Object that includes the updated content, binds the new Content Object to a new unique location-independent name.

Unique Names: A name in a CCN (or named-data network) is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes the name (or name prefix) for the data. A data consumer can disseminate an Interest across a named-data network, which CCN routers can propagate toward a storage device (e.g., a cache server) or a data producer that can provide the a matching Content Object to satisfy the Interest.

In some embodiments, a system administrator can configure or reconfigure one or more routers across a network by disseminating an Interest packet that includes a payload carrying instructions for deploying the desired changes to the network. The packet can include instructions that configure a router to create, update, or delete one or more entries in a FIB, for example, to establish new route paths and/or to tear down other route paths. The Interest packet's payload can also include instructions that establish Quality of Service (QoS) requirements at a router, such as to perform traffic shaping on an interface or virtual interface of the router.

FIG. 1 illustrates an exemplary computing environment 100 that facilitates processing and forwarding an Interest packet that carries a payload in accordance with an embodiment. Computing environment 100 can include a named-data network 102 (or an information-centric network), which includes a plurality of edge nodes 104 and routing nodes 106. For example, network 102 can be managed by an Internet service provider (ISP), and can include an edge node 104.1 that provides network access to a plurality of client devices. Network 102 can also include an edge node 104.2 that provides network access to a plurality of online services, and/or that interfaces with a back-haul network accessible by a plurality of online services. Both edge nodes 104 and routing nodes 106 can process payload data included in an Interest packet.

Computing environment 100 can also include other network devices that can disseminate Interest packets across network 102. For example, an online-service provider can deploy an online service at a content producer 110 that is accessible via network 102. Content producer 110 can include a server computer or a computer cluster that interfaces with edge node 104.2 of network 102, and can include a repository that stores data for one or more users. However, routing nodes 106 are best able to route a packet to content producer 110 when routing nodes 106 include a FIB entry that maps the packet's name or name prefix to an optimal local interface that can best reach content producer 110.

In some embodiments, the online-service provider can use a network controller 108 to configure an optimal route path to content producer 110 for a given namespace, or for various names or name prefixes. This optimal path can start from an ingress edge node that provides network access to a plurality of client devices, and reaches an egress edge node 104.2 along a path to content producer 110.

Network controller 108 can generate an Interest packet that includes one or more FIB entries for each edge node 104 and each routing node 106 along the Interest's path, and that include instructions for inserting these FIB entries into the corresponding network nodes of network 102. Once an edge node 104 has created the FIB entries, the edge node can proceed to forward the Interest packet using the updated FIB. If the update to the FIB creates or updates an entry associated with the Interest packet's name or name prefix, the edge node can forward the Interest packet along a new path established by the Interest packet's instructions. Hence, network controller 108 can send this packet to edge node 104.1 to establish the optimized path toward content producer 110 by creating the necessary FIB entries to establish the path while forwarding the Interest along the path.

In some embodiments, client device 102 can generate an Interest packet that includes a name or name prefix associated with a path established by network controller 108. Client device 102 can disseminate the Interest to send or obtain the piece of data from any device of network 102 that can satisfy the Interest over an established path. Routers that receive this Interest read a local FIB to obtain a FIB entry associated with the Interest's name or name prefix, and forwards the Interest via an interface or virtual interface indicated by the FIB entry.

Also, in some embodiments, client device 112 can push data toward content producer 110 by also attaching the data as a payload in the Interest packet. A routing node (e.g., edge nodes 104.1 and 104.2) can include a content store (CS) to cache payload data from network packets that pass through network 102 (e.g., to cache Content Objects). If the routing node detects that an Interest packet includes a payload for a consumer of the Interest packet, the routing node can store the Interest packet's payload in the CS, by associating the payload data to the Interest packet's name or name prefix.

Figure 2:
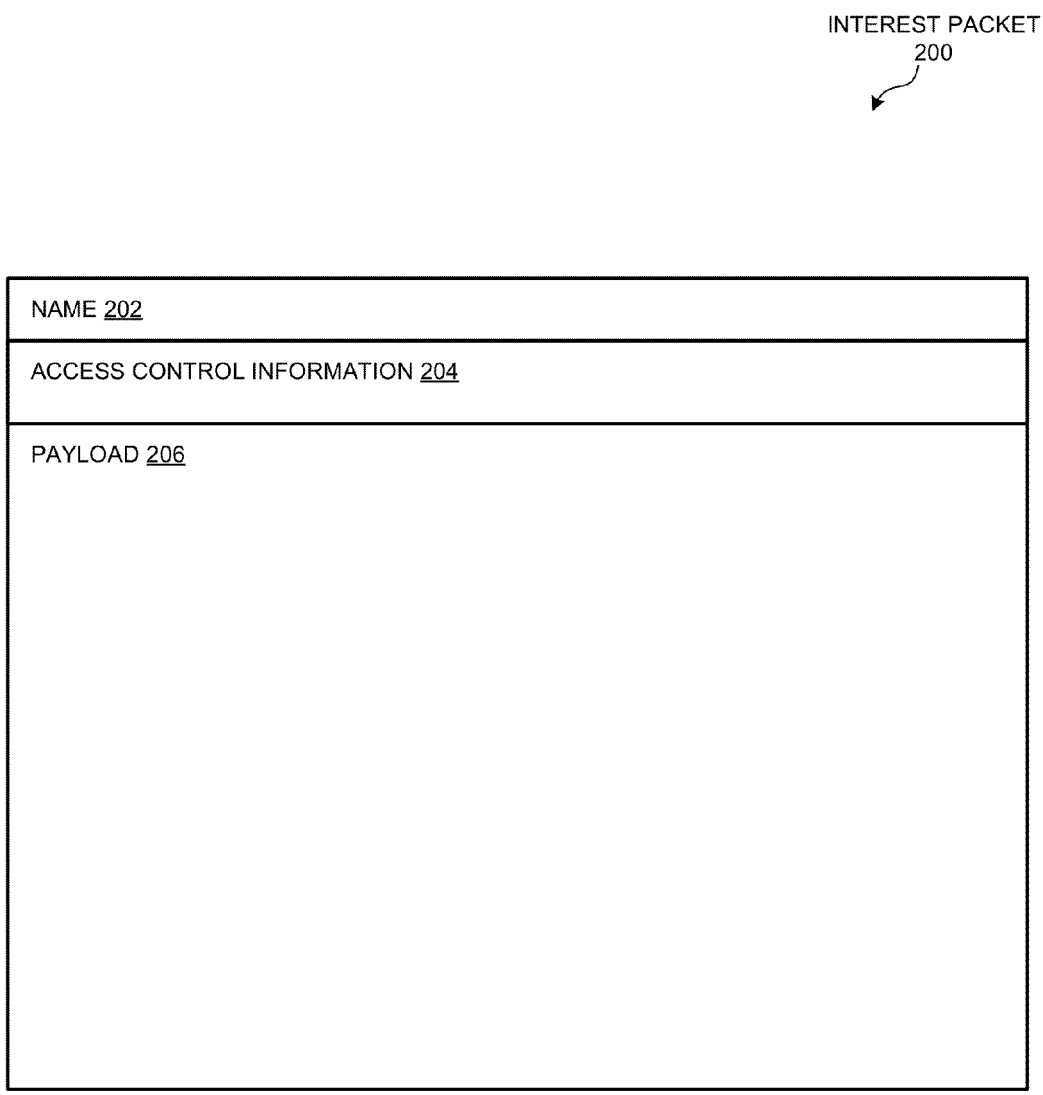
FIG. 2 illustrates an exemplary payload-carrying Interest packet in accordance with an embodiment.

FIG. 2 illustrates an exemplary payload-carrying Interest packet 200 in accordance with an embodiment. Specifically, Interest packet 200 can include a name (or name prefix) 202, access control information 204, and a payload 206. Name 202 can include the information necessary for forwarding Interest packet 200 to a target network device that is to consume Interest packet 200. Payload 206 can hold data for the target device, or can hold instructions to be executed by a router to configure one or more local resources.

If Interest packet 200 is to request data from the target device, access control information 204 can include a digital certificate and/or other authorization information (e.g., a digital certificate) that grants Interest 200 the necessary permission to access the requested information. Payload 206 can include information that the target device can use to process the request for data. For example, payload 206 can include session information from a client device, information from a user interface (e.g., form information), and/or any other data from a client device.

On the other hand, if payload 206 includes instructions that modify a resource at a router, access control information 204 can include authorization information that grants Interest 200 the necessary permission to modify resources at the router. Payload 206 can include instructions to manipulate resources of a CCN, NDN, or ICN architecture, such a Forwarding Information Base (FIB), a Pending Interest Table (PIT), and a Content Store (CS). When the payload instructions are executed by the router, cause the router to manipulate or otherwise perform operations on the resource. These payload instructions can include a script (e.g., instruction written in an interpreted language), or can include a standalone program (e.g., binary instructions executed by a processor or a virtual machine).

For example, a FIB, a PIT, and a CS can each store data that can be used to forward an Interest packet, or for caching or returning data (e.g., a Content Object). Hence, payload 206 can include instructions for the basic functions that can be performed on persistence storage, such as "create," "read," "update," and "delete" (CRUD). The network node can execute the payload's instructions to perform these functions on a local resource. A "create" operation can cause the network node to create an entry in a resource, and a "read" operation can cause the network node to read an entry from the resource. An "update" operation can cause the network node to update an existing resource entry, and a "delete" operation can cause the network node to delete an existing entry of the resource.

In some embodiments, the instructions in payload 206 can also perform custom operations on a FIB entry to dynamically change routes on-the-fly as the Interest packet traverses the network toward a target network node that is to consume Interest packet 200. For example, the payload instructions can remove FIB entries for failed links, or can update the FIB in a way that diverts network traffic away from over-utilized interfaces and toward less-utilized interfaces.

Payload 206 can also include instructions for any other network-device resources now known or later developed. These additional resources can support additional features that are deployed at a network node, or can support additional features of a higher-level named-data networking architecture or information-centric networking architecture. For example, network nodes can also include a "metrics" resource that records various metrics for the network node. The instructions can cause the network node to compile a report of various performance metrics from the metrics resource, to generate a Content Object that includes the metrics report, and to return the Content Object over the named-data network. The network node can also forward the Interest to other network nodes to compile a report at the other network nodes.

TABLE 1

Exemplary Resource Operations for each CRUD Instruction

| | FIB | PIT | CS |
|---|---|---|---|
| Create | Add an entry in the FIB, indexed by a given name or name prefix. The new FIB entry can store a network interface specified in the Interest packet (e.g., to configure a predetermined route), or can store a network interface from which the Interest packet was received (e.g., to establish a route to a content producer). | Add an entry in the PIT, indexed by a given name prefix, to store a given network interface, or to store a network interface from which the packet was received. | Add an entry in the CS, indexed by a given name or name prefix, to store data that is also carried in the Interest's payload. |
| Read | Read an entry in the FIB to obtain a network interface for a given name or name prefix. | Read an entry in the PIT to obtain a network interface for a given name or name prefix. | Read an entry in the CS indexed by a given name or name prefix. If the CS entry exists, return data in the CS entry via an interface from which the Interest was received. |
| Update | Update an existing FIB entry indexed by a given name or name prefix, to insert a given interface into the FIB entry. | Update a PIT entry indexed by a given name or name prefix, to insert a given interface into the PIT entry. | Replace data in a CS entry indexed by a given name or name prefix, to store data also carried in the Interest's payload. If the CS entry does not exist, create the CS entry. |
| Delete | Delete a FIB entry indexed by a given name or name prefix. | Delete a PIT entry indexed by a given name or name prefix. | Delete data in a CS entry indexed by a given name or name prefix. |

As another example, network nodes can include a "QoS" resource that manages routing behavior at the network nodes. Payload 206 can include instructions that create or update a traffic-shaping configuration into the QoS resource. This traffic-shaping configuration can indicate, for example, a maximum bandwidth for a given interface. Also, the payload instructions can also read or delete a traffic-shaping configuration for a given interface.

Table 1 presents an exemplary set of CRUD operations that can be performed on various router resources. When the router detects that an Interest's payload includes instructions to execute, the router can execute these instructions to perform various operations on one or more resources. An example set of resources is listed in the top row of TABLE 1, and the possible operations on these resources are listed in the first column of TABLE 1.

Interest-Forwarding Network Nodes

Figure 3:
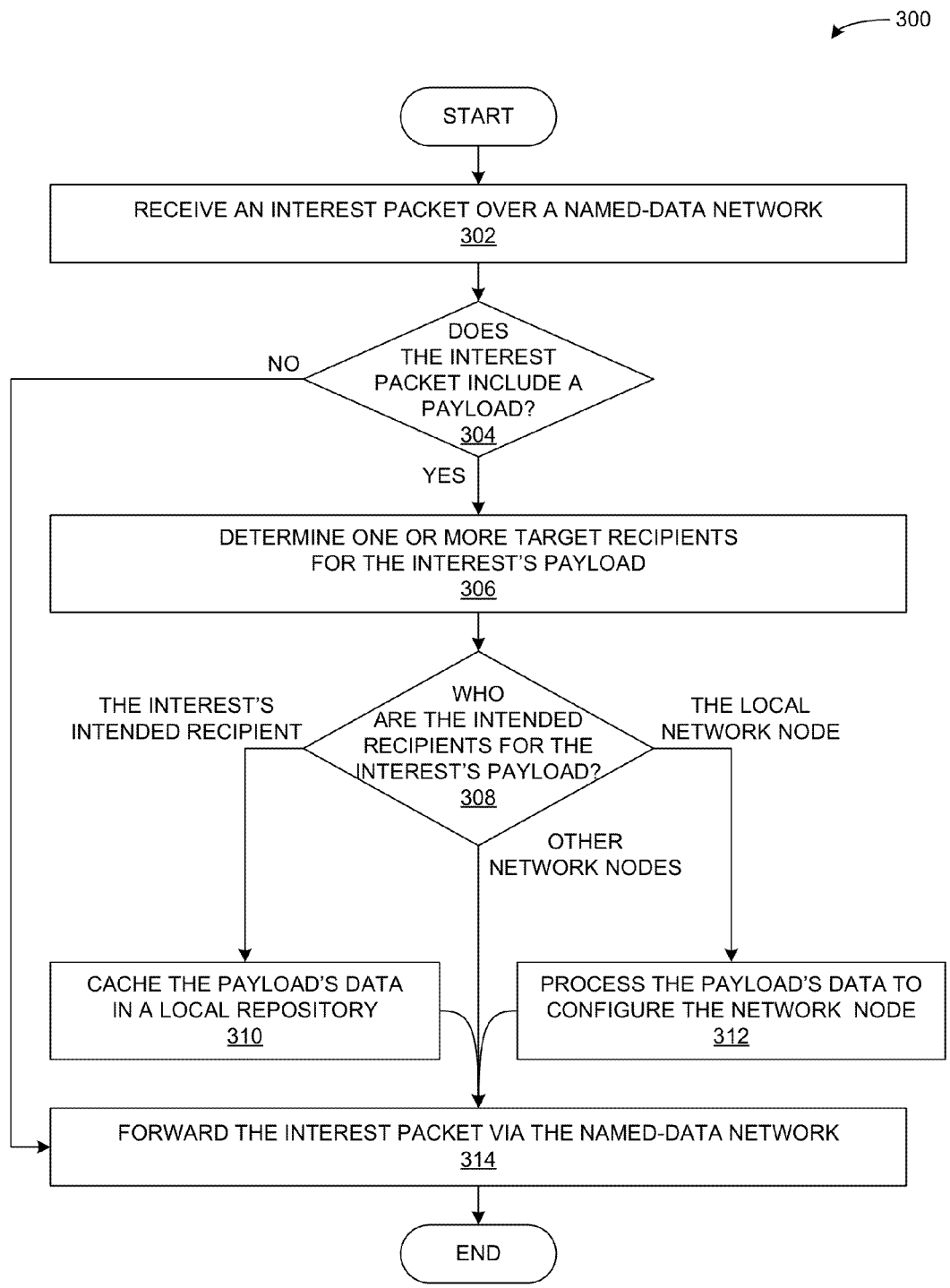
FIG. 3 presents a flow chart illustrating a method for processing a payload-carrying Interest packet at a packet-forwarding network node in accordance with an embodiment.

FIG. 3 presents a flow chart illustrating a method 300 for processing a payload-carrying Interest packet at an Interest-forwarding network node in accordance with an embodiment. During operation, the network node (e.g., a router) can receive an Interest packet over a named-data network (operation 302), and determines whether the Interest packet includes a payload (operation 304).

If the Interest packet does not include a payload, the network node can process the Interest packet as a legacy Interest packet by forwarding the Interest packet over a named-data network (operation 314). Specifically, the network node can perform a lookup in a forwarding information base (FIB) to determine an interface or a virtual interface associated with the Interest's name or name prefix, and uses this interface or virtual interface to forward the Interest packet.

However, if the Interest packet does include a payload, the network node can process the Interest's payload before forwarding the Interest over the named-data network. In some embodiments, the payload may be intended for a target computing device associated with the Interest's name or name prefix. For example, a data producer may advertise one or more names (e.g., using CCN SYNC) to obtain Interests associated with these names. In some other embodiments, the payload may be intended for one or more intermediate network nodes along a path toward the Interest's target computing device. These network nodes can process the payload to configure one or more local resources. These resources can include a forwarding information base (FIB), a pending interest table (PIT), a content store (CS), a repository, and/or any other resources now known or later developed. The network node's resources can also include any other resource accessible to a computing device, such as a processing unit, a memory, a non-volatile storage device, a network interface, etc.

While processing the payload, the network node can determine one or more target recipients for the Interest's payload (operation 306). The network node can determine the target recipients by analyzing parameters within the Interest's name or within metadata in the payload to determine the type of data in the payload, to determine how the payload is to be processed, and/or to determine names and/or network addresses for the network nodes that are to process the payload. For example, the network node can determine that the intended recipient is a server or client computer that is to consume the Interest when the payload includes data whose name matches the Interest's name or name prefix (e.g., as determined from metadata in the payload). As another example, the network node can analyze the payload's metadata to determine one or more other structured names, name prefix, or network addresses that identify one or more network nodes that are to process the Interest's payload as the intended recipients of the payload.

The network node then determines how to process the Interest and its payload depending on who the intended recipients are for the payload (operation 308). If the intended recipient for the payload includes the Interest's intended recipient (e.g., a custodian or a content producer associated with the Interest's name or name prefix), the network node can cache the payload's data in a local repository in association with the Interest's name or name prefix (operation 310). For example, a content-distribution server can pre-cache data at various network nodes by disseminating an Interest whose payload includes the data to pre-cache in association with the Interest's name. This Interest effectively "pushes" the payload to one or more servers or client devices that have subscribed to the Interest's name or name prefix, and also allows the network nodes along the paths to the Interest's recipients to cache the payload. After caching the payload, the network node can proceed to forward the interest packet via the named-data network (operation 314).

If the intended recipients for the Interest's payload include the local network node, the local network node can process the payload's data locally, for example to configure one or more resources of the local network node (operation 312). The payload can include program instructions, a binary executable file, a virtual machine executable file, a script, etc. The payload can also include a configuration file that indicates one or more settings that are to be applied to the local network node. The network node can parse the configuration file to determine these configuration settings, and applies these settings to the local resources. For example, the configuration settings can include data to insert into an FIB entry, into a PIT entry, or into a CS entry. After processing the payload, the network node can proceed to operation 314 to forward the Interest via the named-data network.

In some embodiments, if the payload is intended for other network nodes (e.g., the local network node is not associated with a name or name prefix indicated in metadata within the Interest's payload), the local network node can proceed to operation 314 to forward the Interest packet without caching or processing the Interest's payload.

Figure 4:
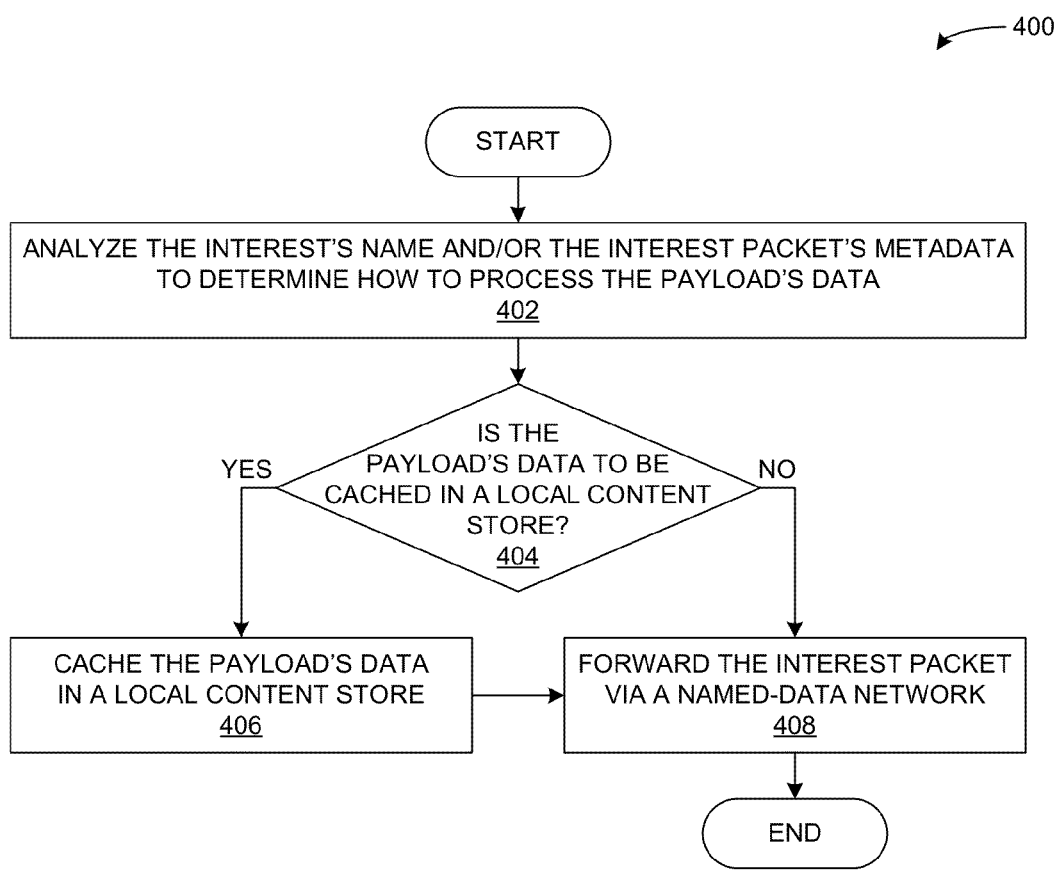
FIG. 4 presents a flow chart illustrating a method for caching an Interest's payload in accordance with an embodiment.

FIG. 4 presents a flow chart illustrating a method 400 for caching an Interest's payload in accordance with an embodiment. During operation, the network node can analyze the Interest's name and/or the Interest packet's metadata to determine how to process the payload's data (operation 402), and determines whether the payload's data is to be cached in a local content store (operation 404).

In some embodiments, the Interest's payload can include metadata associated with the payload's data. This metadata can include a name for the payload's data, and can include a data type for the payload's data. The network node may determine that the payload is to be cached, for example, in response to determining that the payload includes data that is intended for the same target device that is to consume the Interest, and determining that the payload's data type falls within a set of file types. The network node may determine that the payload is intended for the same target device that is to consume the Interest by determining that the Interest's name or name prefix matches a name for the payload's data.

If the payload's data is to be cached, the network node proceeds to cache the payload's data in a local content store (operation 406), and forwards the interest packet via a named-data network (operation 408). However, if the payload's data is not to be cached, the network node can proceed to forward the Interest packet without caching the payload in the local content store.

Figure 5:
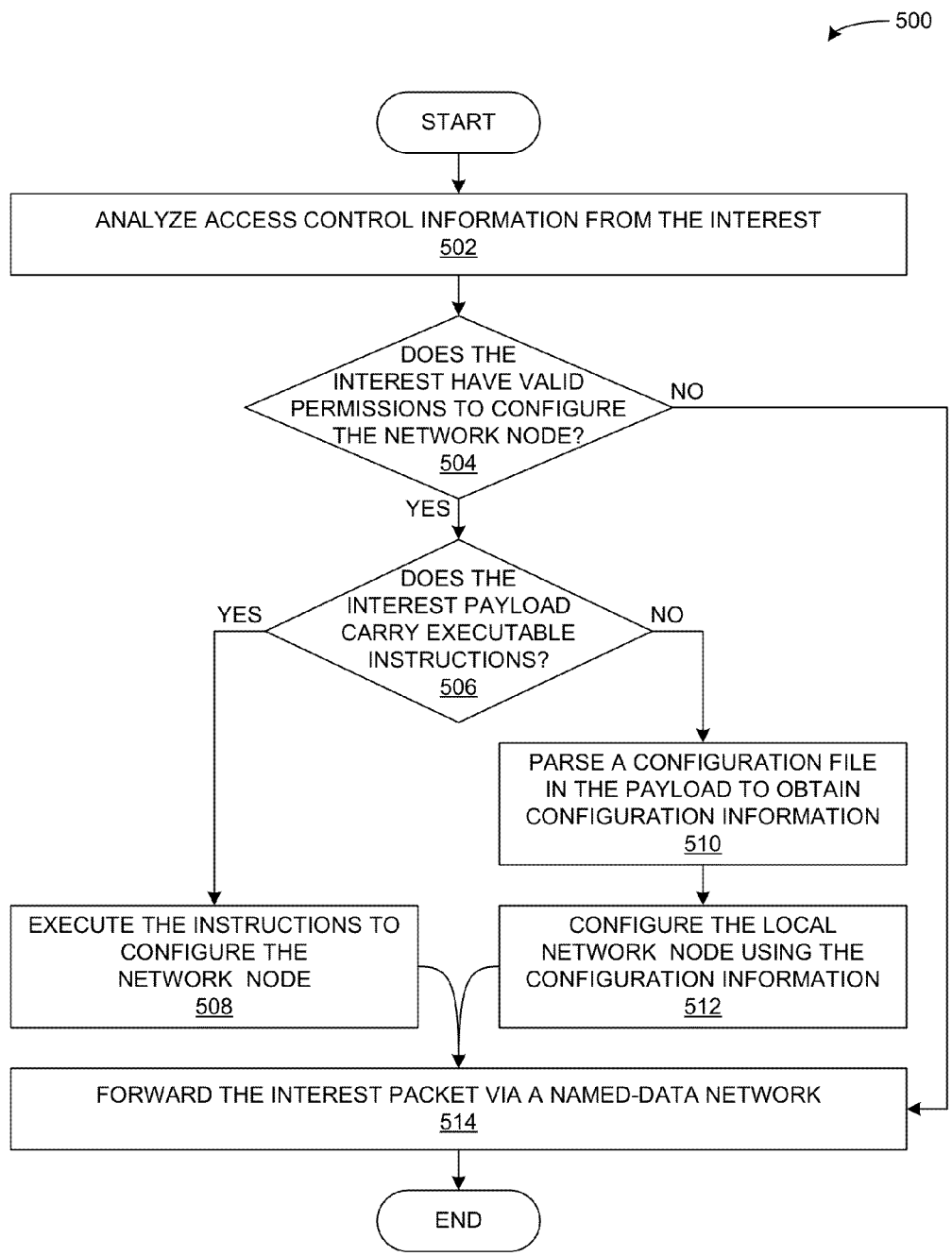
FIG. 5 presents a flow chart illustrating a method for processing an Interest's payload to configure a network node in accordance with an embodiment.

FIG. 5 presents a flow chart illustrating a method 500 for processing an Interest's payload to configure a router node in accordance with an embodiment. During operation, the network node can analyze access control information from the Interest (operation 502), and determines whether the Interest has valid permissions to configure one or more resources of the local network node (operation 504). If the Interest does not have valid permission to modify a resource, the network node can proceed to forward the Interest packet via a named-data network (operation 514).

However, if the Interest does have valid permissions to modify a resource, the network node can proceed to determine whether the Interest's payload carries executable instructions (operation 506). These executable instructions can include CRUD operations that create, update, and/or delete entries in a FIB, a PIT, and/or a CS. If the payload carries executable instructions, the network node processes the payload by executing the instructions to configure resources of the local network node (operation 508), and proceeds to operation 514 to forward the Interest over the named-data network.

If the payload does not include executable instructions, the network node can parse a configuration file in the Interest's payload to determine configuration information (operation 510), and configures one or more resources of the local network node using the configuration information (operation 512). For example, the configuration file can include an extensible markup language (XML) document that indicates one or more resources, indicates one or more configuration variables for each listed resource, and indicates a configuration value for each configuration variable. The network node can also proceed to operation 512 to forward the Interest packet via the named-data network.

Interest Consumers

Figure 6:
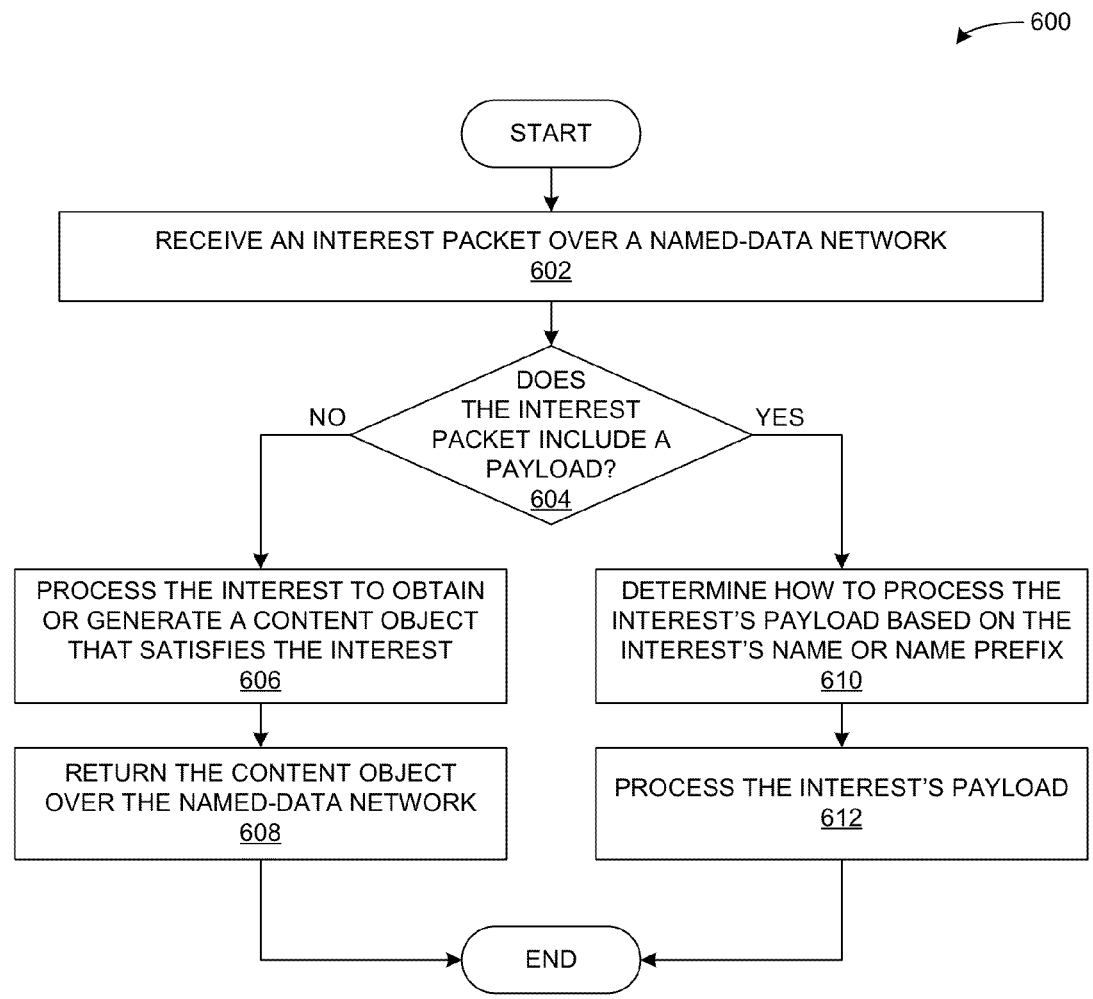
FIG. 6 presents a flow chart illustrating a method for processing an Interest's payload at a target network device that consumes the Interest in accordance with an embodiment.

FIG. 6 presents a flow chart illustrating a method 600 for processing an Interest's payload at a target network device that consumes the Interest in accordance with an embodiment. During operation, the target network device can receive an Interest packet over a named-data network (operation 602), and determines whether the Interest packet includes a payload (operation 604). If the Interest does not include a payload, the target network device can process the Interest as a legacy Interest. For example, the target network device can process the Interest to obtain or generate a Content Object that satisfies the Interest (operation 606), and returns the Content Object over the named-data network (operation 608).

However, if the Interest does include a payload, the target network device can determine how the payload is to be processed based on the Interest's name or name prefix, and/or based on metadata in the Interest's payload (operation 610). For example, the name or the metadata may indicate a data type for the payload. The network device can determine an operation to perform on the payload based on the data type, and performs this operation on the Interest's payload to process the payload.

In some embodiments, the Interest may include a payload to "push" data to the local network device. The network device can analyze the Interest's name and/or metadata to determine a local application that is to receive the payload's data, and processes the Interest's payload by pushing the payload to the application.

In some embodiments, the network device can also process the Interest to return a Content Object over the named-data network. For example, the network device may include a content producer that hosts or generates content to satisfy an Interest from a client device. When the network device receives the Interest, the network device can process the Interest's payload to obtain information that the network device uses to select or generate content for the client device. This information can include, for example, access control information that grants the client device access to the Content Object, or can includes information necessary for generating the Content Object.

Exemplary Dynamic Operations on a FIB Resource

In some embodiments, an Interest payload can include a payload that carries instructions that deposit FIB entries into various network nodes along a path toward a content producer associated with the Interest's name or name prefix. These network nodes can belong to a named-data network, or to any information-centric network now known or later developed. For example, a content producer can use multiple servers to host content that is to be made available to a plurality of consumers. When the content producer uploads new content to any of these servers, the content producer can disseminate an Interest packet whose payload instructions cause the network nodes to create or update a FIB entry for a given name or name prefix. At each network node, the FIB entry indicates a local interface that the network node is to use to forward Interest packets that match the given name or name prefix toward any of the content producer's servers.

In a CCN architecture, a forwarding node (e.g., a router) can perform a read operation on a FIB to determine an interface (or a virtual interface) to use to forward an Interest packet. If a FIB entry that matches the Interest's name or name prefix does not exist, the forwarding node performs a default action, such as to forward the Interest to a default interface associated with a root namespace (e.g., the namespace "/"). In some embodiments, an Interest's payload can include instructions that are to be used as default operations that the forwarding node executes when a matching FIB entry does not exist.

Alternatively, the Interest's payload can indicate a default outbound interface of the network node that leads to a default server that knows how to reach the target network node, or can indicate an alternative name or name prefix associated with the default server. The content producer can tunnel a path to the default server in a way that creates or writes FIB entries along this path. This way, when a packet associated with the content producer reaches the default server, the default server can forward the packet along an established path to the content producer.

Exemplary Dynamic Operations on a PIT Resource

In a CCN architecture, a network node reads a PIT entry to forward an Interest through an interface that has been mapped to that Interest's name. In some embodiments of the present invention, an Interest can include a payload that carries instructions that update a PIT entry to redirect a path for a given namespace. For example, when a network node goes offline or an ISP takes the node offline, the ISP can generate an Interest that includes payload instructions to redirect the network path away from the offline node. The Interest's name or name prefix can be associated with a network node at which the network path is to be redirected, which allows the named-data network or information-centric network to forward the Interest to this network node. Also, the Interest's payload can include instructions to update PIT entries that formed a network path through the offline node so that the updated PIT entries form a path through an alternative network node.

Exemplary Dynamic Operations on a CS Resource

In a typical CCN architecture, when a content producer receives an Interest, the content producer can return a Content Object that satisfies the Interest, and forwarding nodes throughout the network can cache the Content Object in a Content Store (CS). This allows the forwarding nodes to satisfy other Interests for the same Content Object, without having to forward the Interest to the content producer. However, a content producer may not always want the Content Objects to be cached or to remain cached for an extended period of time, such as for short-lived data (e.g., a stock quote) or for user-specific data (e.g., private account information).

In some embodiments, a content producer can utilize Interest payloads to perform cache management across various forwarding nodes that have been configured to cache content for the content producer. This allows the content producer to specify which packets are to have their payload cached, and to specify which cached data need to be updated (replaced) or deleted. For example, an online streaming service, such as Netflix Inc., may lease storage space across various edge nodes of an Internet service provider's network to store popular media streams. This allows the content producer to control which media streams are to be cached at any given point in time. A particular video may be popular for two weeks after it is made available via the service, but the demand for this video may diminish thereafter. In some instances, the ISP's cache servers may continue to store the video until other popular data needs to occupy the storage space, which can cause the ISP's cache servers to store the video even after its popularity has dwindled. Once the content producer determines that interest in the video has decayed below a given threshold, the content producer can disseminate an Interest whose payload includes instructions that proactively purges this video from the ISP's cache servers to reduce the storage fees the content producer pays to the ISP.

Also, the content producer can push data to a client device without caching this data at the ISP's cache servers, for example, by generating the Interest that includes a payload carrying the data, and carrying metadata indicating that the payload data is not to be cached. This can ensure that sensitive data, unpopular data, or time-specific data does not occupy valuable space at a content store.

In some embodiments, a content producer can purge cached data from various network nodes by disseminating an Interest that includes instructions that are to be used by these network nodes to delete any entries that match a given name or name prefix (e.g., the Interest's name, or a name specified in the payload). For example, an online service can allow forwarding nodes to cache the user's information while the online service has an active session with the user. The online service may assign to each piece of data a namespace associated with the user or the user's session, which allows the forwarding nodes to use this common namespace to cache data that has been sent to the user's device. Once the user's session has timed out or has been terminated by the user, the online service can disseminate an Interest whose payload includes instructions that delete any entries that match the namespace. Alternatively, the user's client device can disseminate an Interest that is to traverse a path to the content producer, and that includes instructions to delete any Content Objects from the content store that fall under the namespace.

As a further example, the online service may periodically push data to various client devices through a persistent tunnel, and various forwarding nodes can cache the data to satisfy new requests for the data (e.g., to satisfy an Interest). If the data becomes obsolete, the online service can disseminate an Interest whose payload includes a namespace that matches the cached data, and includes instructions that delete any cached data with a name prefix that matches this namespace. The online service can also replace the obsolete data in the CS by creating an Interest that includes the new data in its payload, and includes instructions to update any CS entries associated with a given name or name prefix. For example, an online brokerage company can periodically push new stock quotes to its users by generating an Interest for each updated stock quote, such that this Interest includes a payload carrying the updated stock quotes, and instructions that update (replace) an older version of the stock quote with the updated stock quote.

Exemplary Dynamic Operations for Performing Resource Analytics

In some embodiments, a system administrator can generate and disseminate an Interest packet that allows the administrator to gather utilization statistics from various forwarding nodes and cache servers. The system administrator can obtain utilization statistics at a particular resource by generating an Interest that includes a payload carrying instructions that reads and/or compiles the utilization statistics from the resource.

For example, the system administrator can obtain utilization statistics at a particular router interface by generating an Interest that is directed to the router's interface. The Interest can include a name or name prefix associated with the router, and can include instructions that read and compile utilization statistics associated with this interface. The Interest's payload can include parameters that indicate which types of utilization statistics are to be gathered. These utilization statistics can include a network bandwidth being utilized by a given interface, a number of packets that have been received and/or transmitted over a given time interval by a given interface, a utilization for a particular link, a bandwidth utilization for a given link, etc.

As another example, the system administrator can obtain utilization statistics from a given content store by generating an Interest that includes a name that's mapped to the content store. The Interest can also include a payload carrying instructions that compile the desired utilization statistics. The Interest's payload can also include parameters that indicate the utilization statistics that are to be gathered, such as a number of Content Objects cached for a given namespace, or a size of the data stored for a given namespace.

Figure 7:
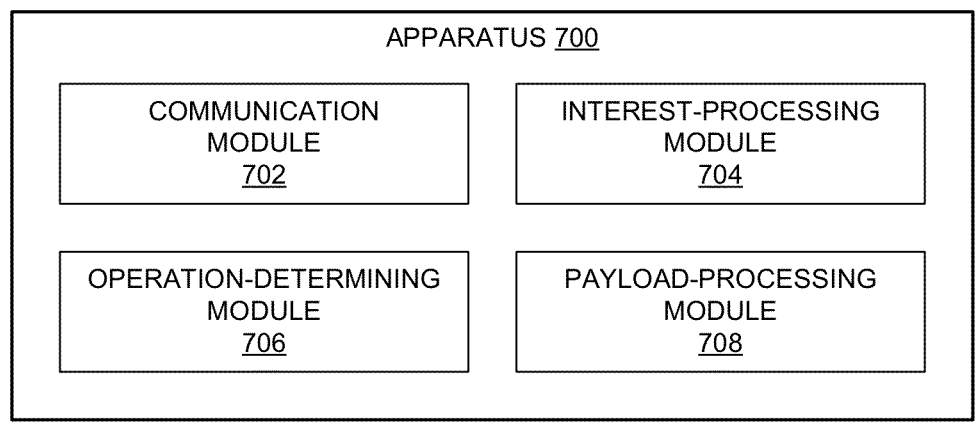
FIG. 7 illustrates an exemplary apparatus that facilitates processing and forwarding a payload-carrying Interest packet in accordance with an embodiment.

FIG. 7 illustrates an exemplary apparatus 700 that facilitates processing and forwarding a payload-carrying Interest packet in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, an interest-processing module 704, an operation-determining module 706, and a payload-processing module 708.

In some embodiments, communication module 702 can receive an Interest packet that includes a name or a name prefix associated with one or more target entities for the Interest. Interest-processing module 704 can determining whether the Interest packet includes a payload to process. Operation-determining module 706 can determine a payload-processing operation to perform to process the payload. Payload-processing module 708 can process the payload by performing the determined operation.

Figure 8:
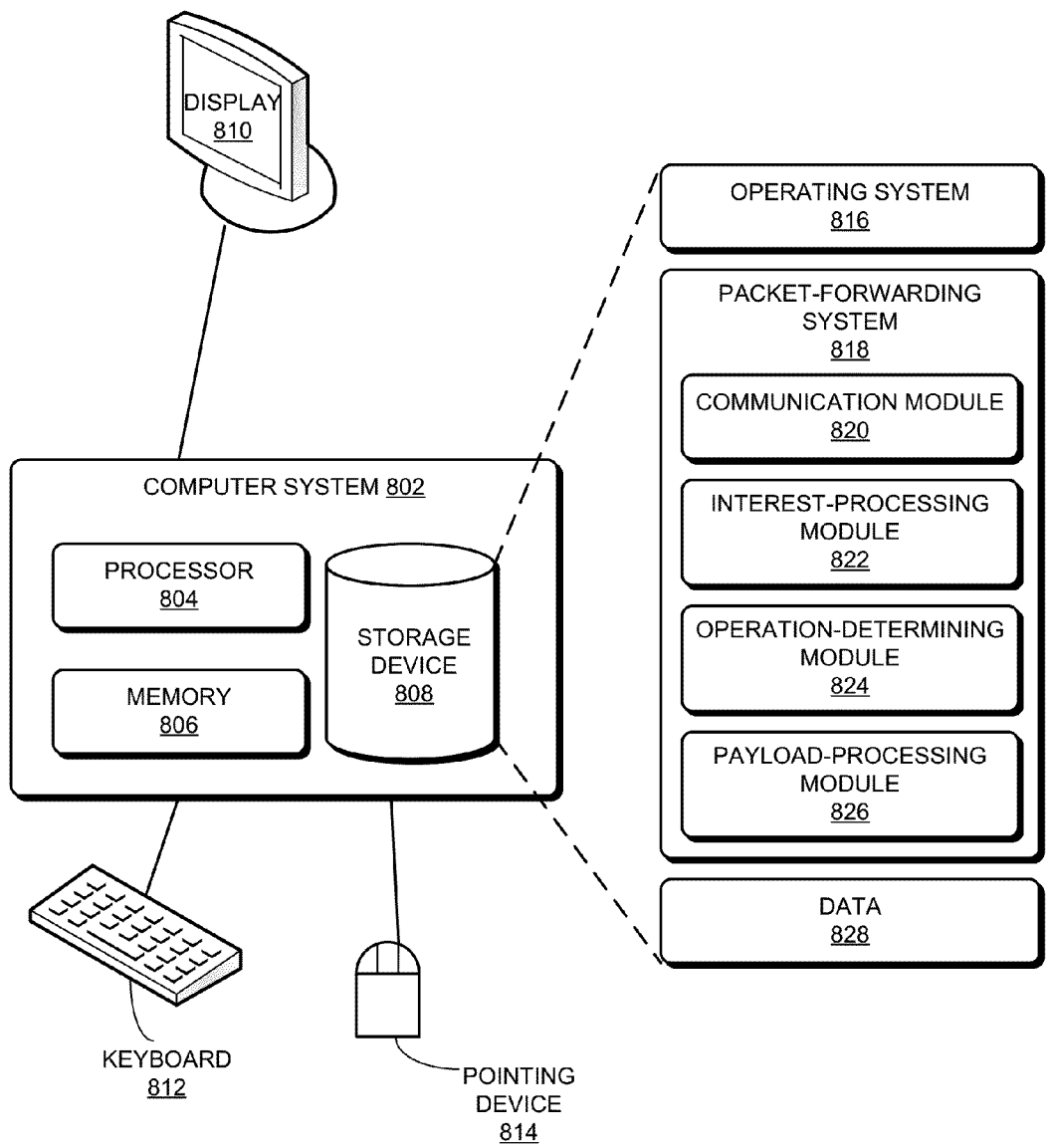
FIG. 8 illustrates an exemplary computer system that facilitates processing and forwarding a payload-carrying Interest packet in accordance with an embodiment.

FIG. 8 illustrates an exemplary computer system 802 that facilitates processing and forwarding a payload-carrying Interest packet in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, Interest-processing system 818, and data 828.

Interest-processing system 818 can include instructions, which when executed by computer system 802, can cause computer system 802 to perform methods and/or processes described in this disclosure. Specifically, Interest-processing system 818 may include instructions for receiving an Interest packet that includes a name or a name prefix associated with one or more target entities for the Interest (communication module 820). Further, Interest-processing system 818 can include instructions for determining whether the Interest packet includes a payload to process (Interest-processing module 822). Interest-processing system 818 can also include instructions for determining a payload-processing operation to perform to process the payload (operation-determining module 824). Interest-processing system 818 can also include instructions for processing the payload by performing the determined operation (payload-processing module 826).

Data 828 can include any data that is required as input or that is generated as output by the methods and/or processes described in this disclosure. Specifically, data 828 can store at least a FIB, a PIT, and a Content Store (CS), and information necessary for performing operations on the FIB, the PIT, and/or the CS.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
  receiving an Interest packet by a network node, wherein the Interest packet includes a name or a name prefix associated with one or more target entities for the Interest, and includes access control information;

determining that the Interest packet includes a payload, wherein the payload includes instructions or data for configuring a network node;

determining an operation to perform for processing the payload;

processing the payload by performing the determined operation, wherein processing the Interest's payload involves:

determining whether the access control information grants the Interest packet permission to reconfigure the network node; and responsive to determining that the access control information grants permission to the Interest packet, executing the instructions to reconfigure the network node.

2. The method of claim 1, wherein the payload includes data for a target entity that is to consume the Interest packet.

3. The method of claim 2, further comprising:

determining, based on the Interest's name, that the local network node is not an intended recipient of the Interest's payload;

wherein processing the payload involves one or more of:
  storing the Interest's payload in a local content store in association with the Interest's name; and
  forwarding the Interest packet via an interface or a virtual interface associated with the Interest packet's name or name prefix.

4. The method of claim 2, further comprising:

determining, based on the Interest's name, that the local network node is an intended recipient of the Interest's payload;

wherein determining the operation to perform involves determining a local application associated with the Interest's name or name prefix; and wherein processing the Interest's payload involves using the application to process the payload.

5. The method of claim 1, wherein the instructions or data includes one or more of:
  program instructions;
  a binary executable file;
  a virtual machine executable file;
  a script; and
  a configuration file.

6. The method of claim 5, wherein the instructions or data configure routing information at the local computing device.

7. The method of claim 5, wherein the instructions or data configure a maximum bandwidth for an interface of the local computing device.

8. A non-transitory computer-readable storage medium storing instructions that when executed by a computer cause the computer to perform a method, the method comprising:

receiving an Interest packet that includes a name or a name prefix associated with one or more target entities for the Interest, and includes access control information;

determining that the Interest packet includes a payload, wherein the payload includes instructions or data for configuring a network node;

determining an operation to perform for processing the payload;

processing the payload by performing the determined operation, wherein processing the Interest's payload involves:

determining whether the access control information grants the Interest packet permission to reconfigure the network node; and responsive to determining that the access control information grants permission to the Interest packet, executing the instructions to reconfigure the network node.

9. The storage medium of claim 8, wherein the payload includes data for a target entity that is to consume the Interest packet.

10. The storage medium of claim 9, further comprising:

determining, based on the Interest's name, that the local network node is not an intended recipient of the Interest's payload;

wherein processing the payload involves one or more of:
  storing the Interest's payload in a local content store in association with the Interest's name; and
  forwarding the Interest packet via an interface or a virtual interface associated with the Interest packet's name or name prefix.

11. The storage medium of claim 9, further comprising:

determining, based on the Interest's name, that the local network node is an intended recipient of the Interest's payload;

wherein determining the operation to perform involves determining a local application associated with the Interest's name or name prefix; and wherein processing the Interest's payload involves using the application to process the payload.

12. The storage medium of claim 8, wherein the instructions or data includes one or more of:
  program instructions;
  a binary executable file;
  a virtual machine executable file;
  a script; and
  a configuration file.

13. The storage medium of claim 12, wherein the instructions or data configure routing information at the local computing device.

14. The storage medium of claim 12, wherein the instructions or data configure a maximum bandwidth for an interface of the local computing device.

15. An apparatus, comprising:

a processor configured to execute instructions that when executed by the apparatus cause the apparatus to implement:

a communication module to receive an Interest packet that includes a name or a name prefix associated with one or more target entities for the Interest, wherein the Interest packet also includes access control information;

an Interest-processing module to determine that the Interest packet includes a payload, wherein the payload instructions or data for configuring a network node;

an operation-determining module to determine a payload-processing operation to perform to process the payload; and a payload-processing module to process the payload by performing the determined operation, wherein processing the Interest's payload involves:

determining whether the access control information grants the Interest packet permission to reconfigure the network node; and responsive to determining that the access control information grants permission to the Interest packet, executing the instructions to reconfigure the network node.

16. The apparatus of claim 15, wherein the payload includes data for a target entity that is to consume the Interest packet.

17. The apparatus of claim 16, wherein while determining the payload-processing operation, the operation-determining module is further configured to:
  determine, based on the Interest's name, that the local network node is not an intended recipient of the Interest's payload; and
  determine that the payload-processing operation involves storing the Interest's payload; and
  wherein while processing the payload, the payload-processing module is further configured to perform one or more of:
    storing the Interest's payload in a local content store in association with the Interest's name; and
    forwarding the Interest packet via an interface or a virtual interface associated with the Interest packet's name or name prefix.

18. The apparatus of claim 16, wherein while determining the payload-processing operation, the operation-determining module is further configured to:
  determine, based on the Interest's name, that the local network node is an intended recipient of the Interest's payload; and
  determine that the operation involves determining a local application associated with the Interest's name or name prefix; and
  wherein while processing the payload, the payload-processing module is further configured to use the application to process the payload.

19. The apparatus of claim 15, wherein the instructions or data includes one or more of:
  program instructions;
  a binary executable file;
  a virtual machine executable file;
  a script; and
  a configuration file.

20. The apparatus of claim 19, wherein the instructions or data configure routing information at the local computing device.

21. The apparatus of claim 19, wherein the instructions or data configure a maximum bandwidth for an interface of the local computing device.

* * * * *